United States Patent [19]
Al-Ali

[11] Patent Number: 6,083,384
[45] Date of Patent: Jul. 4, 2000

[54] METHOD AND APPARATUS FOR COLLECTING A SUBSTANCE

[76] Inventor: Amier Al-Ali, P.O. Box 24332, Safat 13104, Kuwait

[21] Appl. No.: 09/240,700

[22] Filed: Feb. 2, 1999

[51] Int. Cl.[7] .................................................. C02F 1/02
[52] U.S. Cl. .......................... 210/175; 210/258; 210/774; 210/922; 210/923
[58] Field of Search ................................... 210/175, 180, 210/774, 252, 258, 922, 923

[56] References Cited

U.S. PATENT DOCUMENTS

| | | |
|---|---|---|
| 1,952,281 | 3/1934 | Ranque . |
| 2,759,661 | 8/1956 | Noller et al. . |
| 3,371,618 | 3/1968 | Chambers . |
| 3,726,406 | 4/1973 | Damberger . |
| 3,831,756 | 8/1974 | Bhuta et al. . |
| 3,922,225 | 11/1975 | Strain . |
| 4,194,978 | 3/1980 | Crema . |
| 4,316,805 | 2/1982 | Faust et al. . |
| 4,487,553 | 12/1984 | Nagata . |
| 4,762,467 | 8/1988 | Ackermann et al. . |
| 5,035,536 | 7/1991 | Von Winckelmann . |
| 5,089,121 | 2/1992 | McWhinnie . |
| 5,154,835 | 10/1992 | DeMichael . |
| 5,200,066 | 4/1993 | Jorgensen . |
| 5,215,407 | 6/1993 | Brelsford . |
| 5,254,266 | 10/1993 | Barnes et al. . |
| 5,511,906 | 4/1996 | Öberg . |
| 5,561,982 | 10/1996 | Tunkel et al. ................................ 62/5 |
| 5,879,548 | 3/1999 | Al-Ali . |

OTHER PUBLICATIONS

C.D. Fulton, Ranque's Tube, Journal of the ASRE, pp. 473–473, May 1950.

Thomas Register Catalog File, Vortec Corporation, pp. 12418–12421, 1992.

*Primary Examiner*—David A. Simmons
*Assistant Examiner*—Betsey J. Morrison
*Attorney, Agent, or Firm*—Roylance, Abrams, Berdo & Goodman, L.L.P.

[57] ABSTRACT

An apparatus for collecting a substance has a fluid source providing pressurized fluid, a heating device, a heat transferring device and a vacuum producing device. The heating device is coupled to the fluid source and is adapted to cause a first pressurized fluid from the fluid source to become heated. The heat transferring device is coupled to the heating device for receiving the heated first pressurized fluid, and is adapted for transferring heat from the first pressurized fluid to a heatable substance. The vacuum producing device has first and second inlet openings, the first inlet opening is fluidly coupled to the fluid source for receiving a second pressurized fluid from the fluid source and the second inlet opening is adapted for receiving the heatable substance. The variation of the apparatus can recycle heated fluid back into the apparatus once used to heat the heatable substance. Another variation of the apparatus can use the hot and cold fluids from the heating device in heat exchangers, respectively, and multiple heating devices can be used in series to further heat or cool the hot and cold fluids.

33 Claims, 5 Drawing Sheets

METHOD AND APPARATUS FOR COLLECTING A SUBSTANCE

This application is related to U.S. patent application Ser. No. 08/852,295, filed May 7, 1997, now U.S. Pat. No. 5,879,548, issued Mar. 9, 1999, which is hereby incorporated herein by reference, and U.S. patent application Ser. No. 09/206,284, filed Dec. 7, 1998, which is also incorporated herein by reference.

FIELD OF THE INVENTION

The invention generally relates to a method and apparatus for collecting a substance. More specifically, the invention relates to a method and apparatus for retrieving spilled oil using a heating device and a vacuum forming device, both devices having only stationary elements, and additionally for heating and/or cooling other items; such as water or air.

BACKGROUND OF THE INVENTION

The pollution of the environment by spilling harmful substances, either intentionally or unintentionally, can cause significant damage to the environment. This is especially true if the harmful substances are not quickly retrieved. One of the more commonly spilled pollutants is oil. Large quantities of oil are spilled on both land and sea in a variety of ways. For instance, oil can be spilled during on-shore and off-shore oil exploration, by accidents occurring during the transportation of oil both on land and on sea, and even through the normal, but inefficient, use of oil. Whatever the reason for the oil spill, it is of great environmental concern to retrieve the spilled oil quickly and efficiently, and clean the polluted areas.

There exists many conventional devices for retrieving spilled substances such as oil. These conventional retrieving devices commonly employ various absorption, suction, centrifugal and skimming techniques. However, conventional retrieving devices suffer from a number of disadvantages. In particular, conventional retrieving devices are often complex, expensive devices that are difficult to operate, prone to breaking down, and not easily fixed. These disadvantages become especially problematic during lengthy clean-ups of large spills. Additionally, conventional devices are not generally versatile. Often, they are designed for specific environments, i.e., calm waters, and/or they have a small capacity. Further, conventional devices often experience great difficulty in handling high viscous oils or oil made more viscous due to being spilled in cold environments. Still further, conventional devices are limited only for retrieving items and can not perform other functions such as heating and cooling of living conditions.

Examples of prior art oil spill retrieval systems are disclosed in the following U.S. Pat. No. 3,726,406 to Damberger; U.S. Pat. No. 3,831,756 to Bhuta et al.; U.S. Pat. No. 3,922,225 to Strain; U.S. Pat. No. 4,194,497 to Crema; U.S. Pat. No. 4,316,805 to Faust et al.; U.S. Pat. No. 5,035,536 to von Winckelmann; U.S. Pat. No. 5,089,121 to McWhinnie; U.S. Pat. No. 5,154,835 to DeMichael; U.S. Pat. No. 5,200,066 to Jorgensen; U.S. Pat. No. 5,215,407 to Brelsford; U.S. Pat. No. 5,254,266 to Barnes et al.; and U.S. Pat. No. 5,511,906 to Oberg.

In view of the above, it is apparent that there exists a need for a method and apparatus for collecting a substance that is simple, inexpensive, efficient, capable of retrieving substances that are highly viscous, and capable of performing multiple functions beyond collecting substances. This invention addresses these needs in the art, along with other needs, which will become apparent to those skilled in the art once given this disclosure.

SUMMARY OF THE INVENTION

Accordingly, an object of the present invention is to provide a simple, inexpensive method and apparatus for collecting a substance.

Another object of the present invention is to provide a method for heating or cooling various elements with or without collecting a substance.

Another object of the present invention is to provide a versatile method and apparatus for collecting large volumes of spilled pollutants over a wide range of physical environments.

Still another object of the present invention is to provide a method and apparatus for collecting spilled oil that is highly viscous and/or is located in cold environments.

Still another object of the present invention is to provide a collecting method and apparatus that involves supplying a pressurized fluid to elements that have no moving parts.

Yet another object of the present invention is to provide a collecting method and apparatus that employs, either singularly or together, a vortex tube for supplying a heated fluid, and a jet pump for supplying suction.

A further object of the present invention is to provide a collecting method and apparatus that delivers pressurized gas from a single source to a system having elements that only require pressurized gas to operate, and that function with no moving parts.

The foregoing objects are basically attained by providing an apparatus for collecting a substance, comprising: a fluid source for providing a first and a second pressurized fluid; a first heating device coupled to the fluid source and being adapted to heat the first pressurized fluid from the fluid source; a first heat transferring device coupled to the first heating device for receiving the heated first pressurized fluid, and being adapted for transferring heat from the first pressurized fluid to a first heatable substance; a vacuum producing device having first and second inlet openings, the first inlet opening fluidly coupled to the fluid source for receiving a second pressurized fluid from the fluid source and the second inlet opening being adapted for receiving the first heatable substance, and a second heat transferring device coupled to the first heating device for receiving the heated first pressurized fluid, and being adapted for transferring heat from the first pressurized fluid to a second heatable substance.

The objects further being attained by providing an apparatus for collecting a substance, comprising: a fluid source for providing a first and a second pressurized fluid; a first heating device coupled to the fluid source and being adapted to heat a first portion of the first pressurized fluid from the fluid source and to cool a second portion of the first pressurized fluid from the fluid source; a first heat transferring device coupled to the first heating device for receiving the first portion of the first pressurized fluid, and being adapted for transferring heat from the first portion of the first pressurized fluid to a heatable substance; a vacuum producing device having first and second inlet openings, the first inlet opening fluidly coupled to the fluid source for receiving a second pressurized fluid from the fluid source means and the second inlet opening being adapted for receiving the heatable substance, and a second heat transferring device coupled to the first heating device for receiving the second portion of the first pressurized fluid, and being adapted for transferring heat from a coolable substance to the second portion of the first pressurized fluid.

The objects further attained by providing a method of collecting a substance, comprising the steps of: supplying a first pressurized fluid from a source of pressurized fluid to a first heating device; passing the first pressurized fluid through the first heating device to heat the first pressurized fluid; directing the heated first pressurized fluid from the first heating device to a first heat transferring device; transferring heat from the heated first pressurized fluid to a first heatable substance; supplying a second pressurized fluid from the source of pressurized fluid to a first inlet opening of a vacuum forming device; forming suction by passing the second pressurized fluid through the vacuum forming device; extracting the first heatable substance from an area around the first heat transferring device by suction; and directing the heated first pressurized fluid to a second heat transferring device.

The objects being further attained by providing a method of collecting a substance, comprising the steps of: supplying a first pressurized fluid from a source of pressurized fluid to a first heating device; passing the first pressurized fluid through the first heating device to heat a first portion of the first pressurized fluid and to cool a second portion of the first pressurized fluid; directing the heated first portion of the first pressurized fluid from the first heating device to a first heat transferring device; transferring heat from the heated first pressurized fluid to a heatable substance; supplying a second pressurized fluid from the source of pressurized fluid to a first inlet opening of a vacuum forming device; forming suction by passing the second pressurized fluid through the vacuum forming device; extracting the first heatable substance from an area around the first heat transferring device by suction; and directing the cooled second portion of the first pressurized fluid to a second heat transferring device and transferring heat from a coolable substance to the cooled second portion of the first pressurized fluid.

The objects being further attained by providing a method of supplying pressurized fluid to a heat transferring device, comprising the steps of: providing a source of pressurized fluid, a first heating device, a first heat transferring device, a vacuum forming device, and a second heat transferring device all coupled together; supplying a first pressurized fluid from the source of pressurized fluid to the first heating device; passing the first pressurized fluid through the first heating device to heat the first pressurized fluid; directing the heated first pressurized fluid from the first heating device the second heat transferring device; transferring heat from the heated first pressurized fluid to a first heatable substance; and prohibiting the passage of the pressurized fluid from the source of pressurized fluid to the vacuum forming device.

The objects being further attained by providing a method of supplying pressurized fluid to a heat transferring device, comprising the steps of: providing a source of pressurized fluid, a first heating device, a first heat transferring device, a vacuum forming device, and a second heat transferring device all coupled together; supplying a first pressurized fluid from the source of pressurized fluid to the first heating device; passing the first pressurized fluid through the first heating device to heat a first portion of the first pressurized fluid and to cool a second portion of the first pressurized fluid; prohibiting the passage of pressurized fluid from the source of pressurized fluid to the vacuum forming device; and directing the cooled second portion of the first pressurized fluid to a second heat transferring device and transferring heat from a coolable substance to the cooled second portion of the first pressurized fluid.

Other objects, advantages and salient features of the invention will become apparent to those skilled in the art from the following detailed description which, taken in conjunction with the annexed drawings, discloses preferred embodiments of the invention.

BRIEF DESCRIPTION OF THE DRAWING

Referring now to the attached drawing which forms a part of this original disclosure.

DETAILED DESCRIPTION OF THE INVENTION

Figure 1:
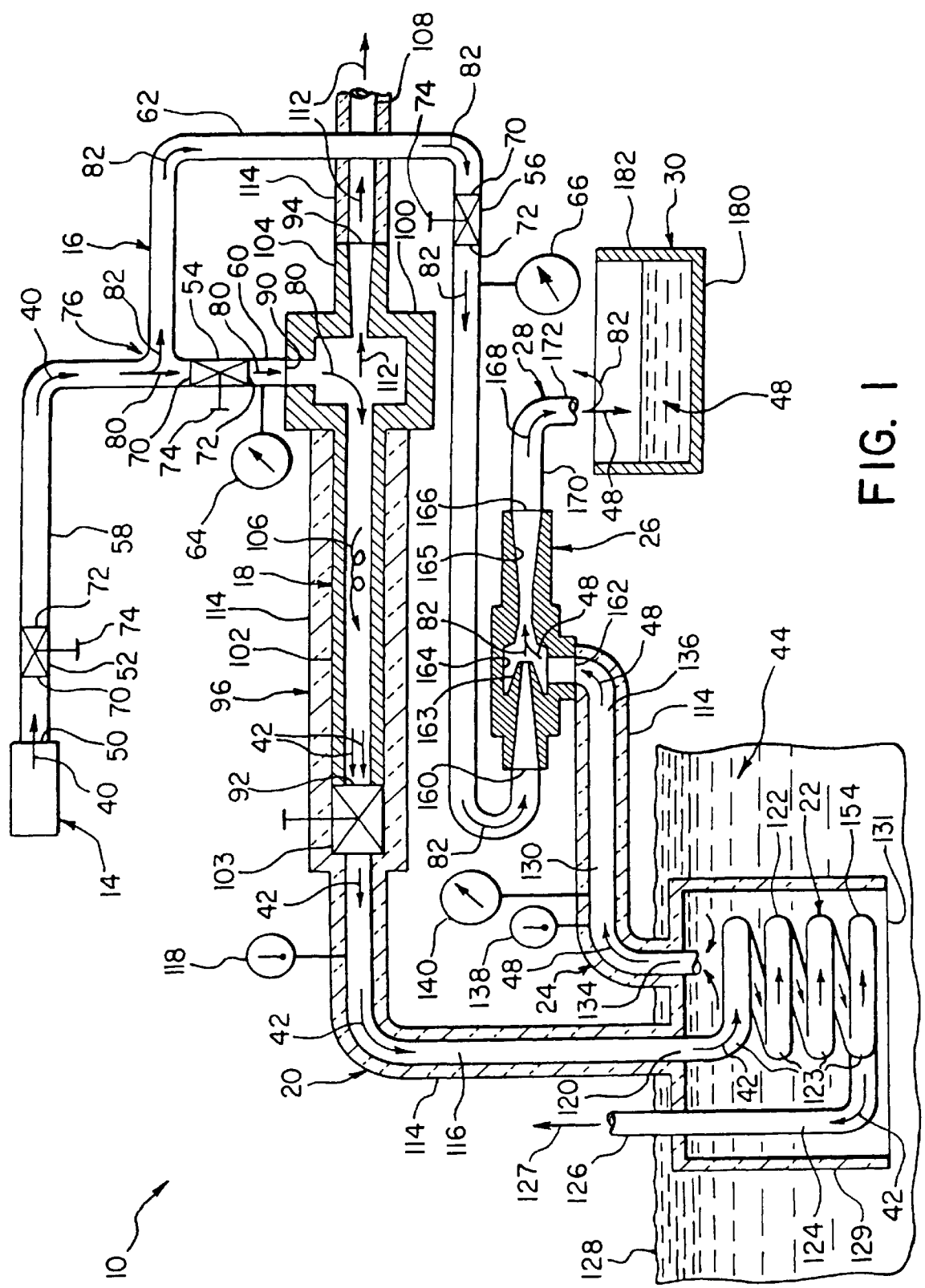
FIG. 1 is a schematic representation of an apparatus for collecting a substance in accordance with the present invention, including illustrating schematic cross-sectional views of the vortex tube, jet pump, reservoir, insulation and insulating housing.

Referring to FIG. 1, an apparatus 10 for collecting a substance in accordance with the present invention is illustrated. Apparatus 10 is especially useful in collecting oil from a body of fluid or water, and basically includes a fluid source 14, a supply conduit system 16, a vortex tube 18, a hot fluid conduit system 20, a heat exchanger 22, a vacuum conduit system 24, a jet pump 26, a transporting conduit system 28 and a reservoir 30. As discussed in greater detail below, fluid source 14 provides pressurized fluid 40 simultaneously to both vortex tube 18 and jet pump 26 via supply conduit system 16. Hot fluid 42 is discharged from vortex tube 18 and is directed to heat exchanger 22 via hot fluid conduit system 20. Heat exchanger 22 is submerged in a heatable substance to be retrieved, such as spilled oil 44 located on a body of water. Heat exchanger 22 allows heat to be transferred from hot fluid 42 to spilled oil 44; thus, making spilled oil 44 less viscous. The portion of pressurized fluid 40 received by jet pump 26 creates a vacuum within jet pump 26 for suctioning and retrieving spilled oil 44 from an area around heat exchanger 22. Retrieved oil 48 is then forced through jet pump 26 via vacuum conduit system 24 and then proceeds through transporting conduit system 28 to reservoir 30.

Fluid source 14 is illustrated schematically in FIG. 1 as a means for providing pressurized fluid 40. Pressurized fluid 40 exits fluid source 14 through an outlet 50 and enters supply conduit system 16. Pressurized fluid 40 supplied by fluid source 14 can take the form of any appropriate, compressible gas, vapor, steam or liquid as necessary and/or desired. Fluid source 14 can be any source of compressible, pressurized fluid that is currently known in the art, or that will be known in the art so long as fluid source 14 provides the desired quantity of the desired compressible, pressurized fluid 40 at the desired pressure levels. Accordingly, fluid source 14 will not be described in detail herein.

Although fluid source 14 is illustrated schematically as a single fluid source, it should be understood that fluid source 14 encompasses multiple fluid sources that can be used in series to provide the desired pressurized fluid 40. Also, as discussed below, fluid source 14 can comprise multiple, separate fluid sources that can be used for supplying a distinct pressurized fluid to each of vortex tube 18 and jet pump 26. This is especially useful when it is desired to supply a different type of pressurized fluid 40 to each of vortex tube 18 and jet pump 26. Preferably, the pressurized fluid 40 supplied to both vortex tube 18 and jet pump 26 is pressurized air.

Supply conduit system 16 includes valves 52, 54 and 56, pipe sections 58, 60 and 62 and pressure gauges 64 and 66. Since valves 52, 54 and 56, pipe sections 58, 60 and 62 and pressure gauges 64 and 66 are conventional and well-known in the art, they will only be briefly described herein. Valves 52, 54 and 56 are preferably substantially identical to each other and made from metallic material. However, different sizes may be employed, as well as different types so long as the basic function of valves 52, 54 and 56 as discussed below is maintained. Each valve 52, 54 and 56 has a valve inlet 70, a valve outlet 72 and a control lever 74 for adjusting the flow of fluid there through. Each valve 52, 54 and 56 enables selective control of pressurized fluid 40 passing there through to the extent that each valve 52, 54 and 56 can maintain a completely open position, a completely closed position prohibiting pressurized fluid 40 from passing there through, and any extent of restricted position between the open and closed positions. Valves 52, 54 and 56 are connected to pipe sections 58, 60 and 62, respectively, in a conventional manner, such as by threaded, mating male and female elements.

Pipe section 58 extends between fluid source 14 and a pipe intersection 76. At pipe intersection 76, pipe section 58 is fluidly coupled to pipe section 60 which leads to vortex tube 18 and to pipe section 62 which leads to jet pump 26. Pipe sections 58, 60 and 62 are preferably metallic, and cylindrical. The connections between fluid source 14, vortex tube 18 and jet pump 26 and their respective adjacent pipe sections 58, 60 and 62, as well as the connections between pipe sections 58, 60 and 62 at pipe intersection 76 are conventional and well-known in the art. Preferably, these connections are between threaded, mating male and female elements.

Valve 52 allows direct control on the amount of pressurized fluid 40 delivered from fluid source 14 into supply conduit system 16. When apparatus 10 is in use, valve 52 permits pressurized fluid 40 to pass there through. Upon exiting valve 52, pressurized fluid 40 proceeds to pipe intersection 76 and splits into two pressurized fluid lines; a first supply fluid 80 and a second supply fluid 82.

First supply fluid 80 enters pipe section 60 and proceeds to valve 54. If apparatus 10 is in use, valve 54 is placed in the open position and first supply fluid 80 proceeds there through. As first supply fluid 80 passes through valve 54, first fluid 80 continues through pipe section 60 until reaching vortex tube 18. Prior to reaching vortex tube 18, the pressure of first supply fluid 80 is measured by pressure gauge 64. The particular location of pressure gauge 64 is convenient for enabling an operator to determine the extent to which valve 54 is restricting or permitting flow of first supply fluid 80 there through, and the precise pressure of first supply fluid 80 entering vortex tube 18.

Second supply fluid 82 continues from pipe intersection 76, through pipe section 62, to valve 56. If apparatus 10 is in use, valve 56 will be in the open position to permit the desired amount of second supply fluid 82 to pass there through. After passing through valve 56, second supply fluid 82 continues proceeding through pipe section 62 to jet pump 26. After leaving valve 56, the pressure of second supply fluid 82 is measured by pressure gauge 66 which is substantially identical to pressure gauge 64. In a manner similar to that discussed above with respect to valve 54 and pressure gauge 64, pressure gauge 66 allows an operator to obtain a direct measurement of the amount of second supply fluid 82 passing through valve 56 and into jet pump 26.

As mentioned above, as an alternative embodiment of the configuration of supply conduit system 16, fluid source 14 can be split into two distinct fluid sources. One fluid source (not shown) can provide first supply fluid 80 directly to vortex tube 18 through pipe section 60, while a second fluid source (not shown) can provide second supply fluid 82 directly to jet pump 26 through pipe section 62.

Vortex tube or heating device 18 has at least one inlet aperture or inlet 90, at least one hot fluid outlet aperture or hot fluid outlet 92, a cold fluid outlet 94, and a connecting portion or vortex chamber 96 positioned between outlets 92 and 94. Vortex chamber 96 has an initiation portion 100, a containing portion 102 and a passage portion 104, and provides a fluid coupling between inlet 90 and both hot fluid outlet 92 and cold fluid outlet 94.

Vortex tube 18 is also known in the art as a Ranque tube, a Hilsch tube or a vortex refrigerator. Vortex tube 18 is conventional and known in the art, and thus, is only shown schematically in FIG. 1 and will only be described briefly herein. Vortex tube 18 has no moving parts, i.e., it is formed entirely of stationary elements, and relies upon the formation of a vortex 106 within vortex chamber 96 which provides hot fluid 42 as well as a cold fluid 112.

U.S. Pat. No. 1,952,281 to Ranque, issued on Mar. 27, 1934 discloses examples of apparatus for obtaining two currents of fluids at different temperatures, i.e., vortex tubes, that can be employed in the present invention. Accordingly, U.S. Pat. No. 1,952,281 to Ranque is hereby incorporated herein by reference. In particular, those portions of U.S. Pat. No. 1,952,281 to Ranque pertaining to the structure and function of the apparatus for obtaining two currents of fluids at different temperatures, or the vortex tubes, are hereby incorporated herein by reference. It should be understood that other configurations for vortex tubes can be employed in apparatus 10 as long as the desired amount of hot fluid 42 is produced.

First supply fluid 80 passes from pipe section 60, through inlet 90 of vortex tube 18, and proceeds into initiation portion 100. Initiation portion 100 is configured such that it directs first supply fluid 80 into a vortex 106 within containing portion 102. Inlet 90 can comprise a single inlet aperture or multiple inlet apertures that are fluidly coupled to pipe section 60 for forming vortex 106.

As mentioned above, vortex 106 provides both hot fluid 42 and cold fluid 112. Hot fluid 42 is formed around the outer areas of vortex 106 and is discharged from containing portion 102 to hot fluid conduit system 20 via valve 103. Meanwhile, cold fluid 112 is formed around the inner areas of vortex 106 and flows back towards initiating portion 100. Cold fluid 112 proceeds through passage portion 104 to cold exhaust pipe section 108, which is surrounded by insulation 114, and to the ambient atmosphere. Cold exhaust pipe section 108 is a conventional pipe section attached to passage portion 104 in a conventional manner and is substantially identical to pipe sections 58, 60 and 62, discussed above.

Outlet 92 of containing portion 102 preferably has multiple openings (not shown) that lead to valve 103 and that are positioned around the perimeter of containing portion 102. Since the openings of outlet 92 are located adjacent the outer portion of vortex 106, only hot fluid 42 on the outer portion of vortex 106 passes through the openings of outlet 92, while cold fluid 112 on the inside of vortex 106 continues through initiation portion 96 and into passage portion 104.

Valve 103 is a conventional throttling valve positioned between containing portion 102 and hot fluid conduit system 20 and is connected to both in a conventional manner. Valve 103 enables the selective determination of the amount of hot fluid 42 to pass from vortex tube 18 to hot fluid conduit system 20. The amount and temperature of hot fluid 42 flowing into hot fluid conduit system 20 is determined, in part, by the amount of hot fluid 42 permitted to pass through valve 103. Additionally, varying the flow of first supply fluid 80 through valve 54 and into vortex tube 18 also provides a method for varying both the pressure and the temperature of hot fluid 42 exiting containing portion 102. This manipulation of vortex tube 18 is conventional and known in the art. Further, in order to maintain hot fluid 42 at a high temperature, both containing portion 102 and valve 103 can be surrounded by insulation 114 as discussed below.

As hot fluid 42 exits vortex tube 18, it enters hot fluid conduit system 20. Hot fluid conduit system 20 comprises a single pipe section 116 and a temperature gauge 118 connected thereto. Pipe section 116 is similar to pipe sections 58, 60, 62 and 108 as discussed above, and provides a conduit for hot fluid 42 to travel from valve 103 to heat exchanger 22. Pipe section 116 and heat exchanger 22 are connected in a conventional manner. Also, pipe section 116 can be surrounded by insulation 114 as further discussed below.

Temperature gauge 118 is schematically shown in FIG. 1 and is conventional and well-known in the art. Thus, temperature gauge 118 will not be described in detail herein. Temperature gauge 118 measures the temperature of hot fluid 42 as it exits valve 103 and proceeds through pipe section 116. Temperature gauge 118 and valve 103 enable an operator of apparatus 10 to determine the temperature of hot fluid 42 proceeding to heat exchanger 22 after restricting or increasing the flow of hot fluid 42 through valve 103.

Heat exchanger or heat transferring device 22 comprises an inlet 120, a helical coil 122 with circular sections 123, and an exhaust portion 124 with an exhaust outlet 126. Inlet 120 is submerged within spilled oil 44 and receives hot fluid 42 from pipe section 116. Hot fluid 42 proceeds past inlet 120 to helical coil 122 and to exhaust portion 124. Preferably, heat exchanger 22 is made of metallic pipe and is substantially identical to pipe sections 58, 60, 62, 108 and 116 as described above, except for its overall shape. Alternatively, since a portion of pipe section 116 and heat exchanger 22 are submerged in spilled oil 44, they may be made of a more durable, corrosion-resistant material.

Heat exchanger 22 is preferably completely submerged within spilled oil 44 except for exhaust outlet 126. Since heat exchanger 22 is substantially submerged in spilled oil 44, a maximum amount of heat is transferred from hot fluid 42 to spilled oil 44. Also, helical coil 122 is a spiral comprised of multiple, generally circular sections 123 forming a curve in a cylindrical form. Circular sections 123 are spaced from each other so that spilled oil 44 can completely surround the entire surface of helical coil 122 and receive an optimal amount of heat therefrom. Exhaust portion 124 is fluidly coupled to the bottommost circular section 154 and extends upwards to exhaust outlet 126 which is above the surface 128 of spilled oil 44. Exhaust outlet 126 enables hot fluid 42 to be discharged into the atmosphere as a released fluid 127. Released fluid 127 having transferred heat to spilled oil 44 as it passed through heat exchanger 22 as hot fluid 42.

Although heat exchanger 22 has been described as having a helical coil 122 and being spirally shaped, it should be understood that heat exchanger 22 can take any shape and configuration that adequately transfers heat to spilled oil 44. The configuration of heat exchanger 22 illustrated in FIG. 1 is merely one example of a heat exchanger that can be employed by the invention. Further, heat exchanger 22 can be made of various materials to improve its ability to transfer heat. The main purpose of heat exchanger 22 is merely to transfer heat from hot fluid 42 to spilled oil 44 so that the viscosity of spilled oil 44 is decreased; thus, allowing spilled oil 44 to be more easily suctioned into vacuum conduit system 24 as discussed below.

If desired, heat exchanger 22 can be partially enclosed by an insulating housing 129 to maintain the heat transferred by heat exchanger 22 within the spilled oil 44 that is adjacent helical coil 122. Insulating housing 129 is formed of conventional insulating material and prevents heat from heat exchanger 22 from being widely dispersed throughout large quantities of spilled oil 44. Also, insulating housing 129 concentrates the heat so that spilled oil 44 in an area immediately adjacent to helical coil 122 receives more heat and is less viscous. Insulating housing 129 has a bottom opening 131 that allows additional spilled oil 44 to enter the area adjacent heat exchanger 22 and eventually be suctioned out from around heat exchanger 22 through vacuum conduit system 24. As exhaust outlet 124 extends upwardly towards the surface 128 of spilled oil 44, it extends through insulating housing 129.

Although insulating housing 129 is illustrated as enclosing the top and sides of heat exchanger 22, other configurations of insulating housing 129 may be employed. For instance, insulating housing 129 may be partially removed from around heat exchanger 22, or may be adapted with apertures to allow spilled oil 44 to gain easier access to heat exchanger 22. Alternatively, insulating housing 129 can be completely removed from around heat exchanger 22.

Vacuum conduit system 24 comprises a pipe section 130 having an inlet 134 located in the spilled oil 44 and an outlet 136 connected to jet pump 26. Vacuum conduit system 24 also has a temperature gauge 138 and a vacuum pressure gauge 140 connected to pipe section 130. Pipe section 130 is substantially identical to pipe sections 58, 60, 62, 108 and 116 discussed above, and is preferably covered by insulation 114 in a similar manner as pipe section 116. Temperature gauge 138 is substantially identical to temperature gauge 118 discussed above, and vacuum gauge 140 is a conventional vacuum gauge that is known in the art and that adequately measures the vacuum pressure produced by jet pump 26. Thus, temperature gauge 138 and vacuum gauge 140 will not be discussed in detail herein. Vacuum gauge 140 is similar to pressure gauges 64 and 66 discussed above but measures negative, vacuum pressure instead of positive pressure.

Inlet 134 of pipe section 130 is supported in a conventional manner and submerged within spilled oil 44 in close proximity to heat exchanger 22. Thus, inlet 134 receives spilled oil 44 which is in close proximity to heat exchanger 22 and which has received an optimal amount of heat from heat exchanger 22. The spilled oil 44 entering pipe section 130 then becomes retrieved oil 48. Pipe section 130 then provides a fluid coupling from the area around heat exchanger 22, up above surface 128 of spilled oil 44, to jet pump 26. Pipe section 130 and jet pump 26 are connected in a conventional manner, and since pipe section 130 is preferably covered with insulation 114, the retrieved oil 48 within pipe section 130 remains heated and in a state of low viscosity. Temperature gauge 138 is connected to pipe section 130 and measures the temperature of retrieved oil 48 passing within and through pipe section 130.

As discussed above, those portions of apparatus 10 that act as conduits for hot fluid 42 or retrieved oil 48 are surrounded by thermal insulation 114 to decrease the amount of heat loss from hot fluid 42 or retrieved oil 48 to its respective surrounding environment. Insulation 114 is especially helpful in cold environments such as in arctic regions. Insulation 114 extends completely around containing portion 102, valve 103, pipe section 116 and pipe section 130, preferably in an integral manner. Further, insulation 114 is preferably integrally connected with insulating housing 129. Insulation 114 and insulating housing 129 are preferably made from the same insulating material which can be any conventional insulating material that is adequate for the intended use. A more durable insulating material can be used where the insulating material will be exposed to or submerged in spilled oil 44.

Jet pump or vacuum producing device 26 has a first pressurized fluid inlet opening 160, a second heatable substance inlet opening 162, a conical nozzle 163, a cylindrical mixing cavity 164, a conical throat 165 and an outlet opening 166. Jet pump 26 is an ejector, or more specifically, a venturi eductor. Jet pump 26 is conventional and well-known in the art and, therefore, will only be described briefly herein.

Jet pump 26 has no moving parts, i.e., it is formed entirely of stationary elements. Second supply fluid 82 enters jet pump 26 through first inlet opening 160 and proceeds to mixing cavity 164 through nozzle 163. As second supply fluid 82 passes, at high pressure, through mixing cavity 164 and throat 165 towards outlet opening 166, a vacuum is formed creating suction from second inlet opening 162 towards mixing cavity 164. This suction provides the force necessary to extract spilled oil 44 from around heat exchanger 22 and into pipe section 130 and for forcing retrieved oil 48 to jet pump 26. Depending upon the level of suction created, jet pump 26 is capable of sucking any fluid there through, including loose particles and powdery material.

Jet pump 26 can be configured in any number of ways as is known in the art. For example, although FIG. 1 illustrates jet pump 26 receiving second supply fluid 82 in the same direction that mixture 168 exits jet pump 26, jet pump 26 can be configured such that second supply fluid 82 enters jet pump 26 in a direction that is perpendicular to the direction that mixture 168 exits jet pump 26. An example of such an alternative jet pump 26 configuration is disclosed in U.S. Pat. No. 4,487,553 to Nagata issued Dec. 11, 1984 which is hereby incorporated herein by reference. Specifically, those portions of U.S. Pat. No. 4,487,553 to Nagata pertaining to the structure and function of jet pumps are hereby incorporated herein by reference.

Jet pumps or venturi eductors 26 are commercially available from numerous sources and in various sizes. In particular, where a maximum vacuum of 24 inches of mercury is sufficient, Mini Vacuum Pump VR05 from Anver Corporation, Hudson, Mass. is an example of one type of jet pump that can be employed with apparatus 10. However, it should be understood that jet pump 26 will be configured and sized as necessary and/or desired for the particular application of apparatus 10, and specifically, for the desired vacuum pressure.

The amount of suction created by jet pump 26 is measured by vacuum gauge 140 and controlled by the amount of second supply fluid 82 passing through valve 56 and into first inlet opening 160. Thus, an operator of apparatus 10 can restrict or increase flow through valve 56 while observing the actual pressure of second supply fluid 82 entering inlet opening 160 through the use of pressure gauge 66, and while observing the actual vacuum pressure within pipe section 130 by viewing vacuum gauge 140.

After retrieved oil 48 proceeds through pipe section 130 and through inlet opening 162, retrieved oil 48 mixes with second supply fluid 82 within mixing cavity 164 to form a mixture 168. Preferably, mixture 168 is a mixture of air and oil. Mixture 168 is then forced from mixing cavity 164, through throat 165 and outlet 166, to transporting conduit system 28 by the pressure of second supply fluid 82.

Transporting conduit system 28 comprises pipe section 170 having outlet 172. Pipe section 170 is preferably, substantially identical to pipe sections 58, 60, 62, 108, 116 and 130 above and is connected to jet pump 26 in a conventional manner. Pipe section 170 provides a fluid conduit for mixture 168 from outlet opening 166 of jet pump 26 to outlet 172. As mixture 168 passes through outlet 172, second supply fluid 82 escapes to the ambient atmosphere, if second supply fluid 82 is air as preferred or another gas, while retrieved oil 48 falls into reservoir 30. If second supply fluid 82 is liquid, both the liquid and spilled oil 44 will fall into reservoir 30.

Reservoir 30 is a container having a bottom 180 and a side wall portion 182 completely surrounding the perimeter thereof. Once full, reservoir 30 is transported from the spill area for further processing or proper disposal. As an example, if apparatus 10 is employed at sea for recovering spilled oil 44, apparatus 10, excluding reservoir 30, can be attached to a ship (not shown) and selectively lowered into the sea at areas of high concentration of spilled oil 44. Transporting conduit system 28 can then be configured to transport retrieved oil 48 to reservoir 30 located on a barge (not shown) so that a barge of retrieved oil 48 can be pulled away for further processing while the rest of apparatus 10 remains in place to fill the next empty barge. Alternatively, reservoir 30 can be fluidly connected to an additional conduit piping system (not shown) which can transport retrieved oil 48 for further processing or disposal without moving reservoir 30.

The following is an example of a specific application of apparatus 10: Under ambient conditions, heat exchanger 22 was placed in oil 44 in the form of motor oil of grade SAE 10W-30. Pressurized fluid 40 in the form of air and at a constant pressure of 125–130 psi proceeded through apparatus 10 as valves 52 and 54 were opened, valve 103 was partially opened, and valve 56 remained closed. Thus, first supply fluid 80 in the form of high pressure air was passed through vortex tube 18. Cold fluid 112 in the form of cold air then began to exit from cold pipe section 108 and released fluid 127 in the form of air began to become hot as it exited from exhaust outlet 126. The pressurized air 40 was allowed to pass through apparatus 10 until the temperature of hot fluid 42, as measured by temperature gauge 118, reached a steady state. Specifically, the steady state temperature of hot fluid 42 was measured to be 167.1 F by temperature gauge 118. Valve 56 was then fully opened, and second supply fluid 82 in the form of air passed there through to jet pump 26 where retrieved oil 48 and the second supply air 82 formed mixture 168. Mixture 168 proceeded from jet pump 26 through outlet 172. The temperature of oil 44 entering jet pump 26 was measured to be 102 F by temperature gauge 138. After 15 minutes, 294 ml of oil 44 was accumulated in reservoir 30. With the pressurized air 40 lowered to a constant pressure of 95–100 psi, 436 ml of oil 44 was accumulated during the same time frame. Since the jet pump 26 for this application was designed to be more efficient at 80–100 psi, pressurized air 40 at 95–100 psi accumulated more oil 44 than the same system at the higher air pressure.

Figure 2:
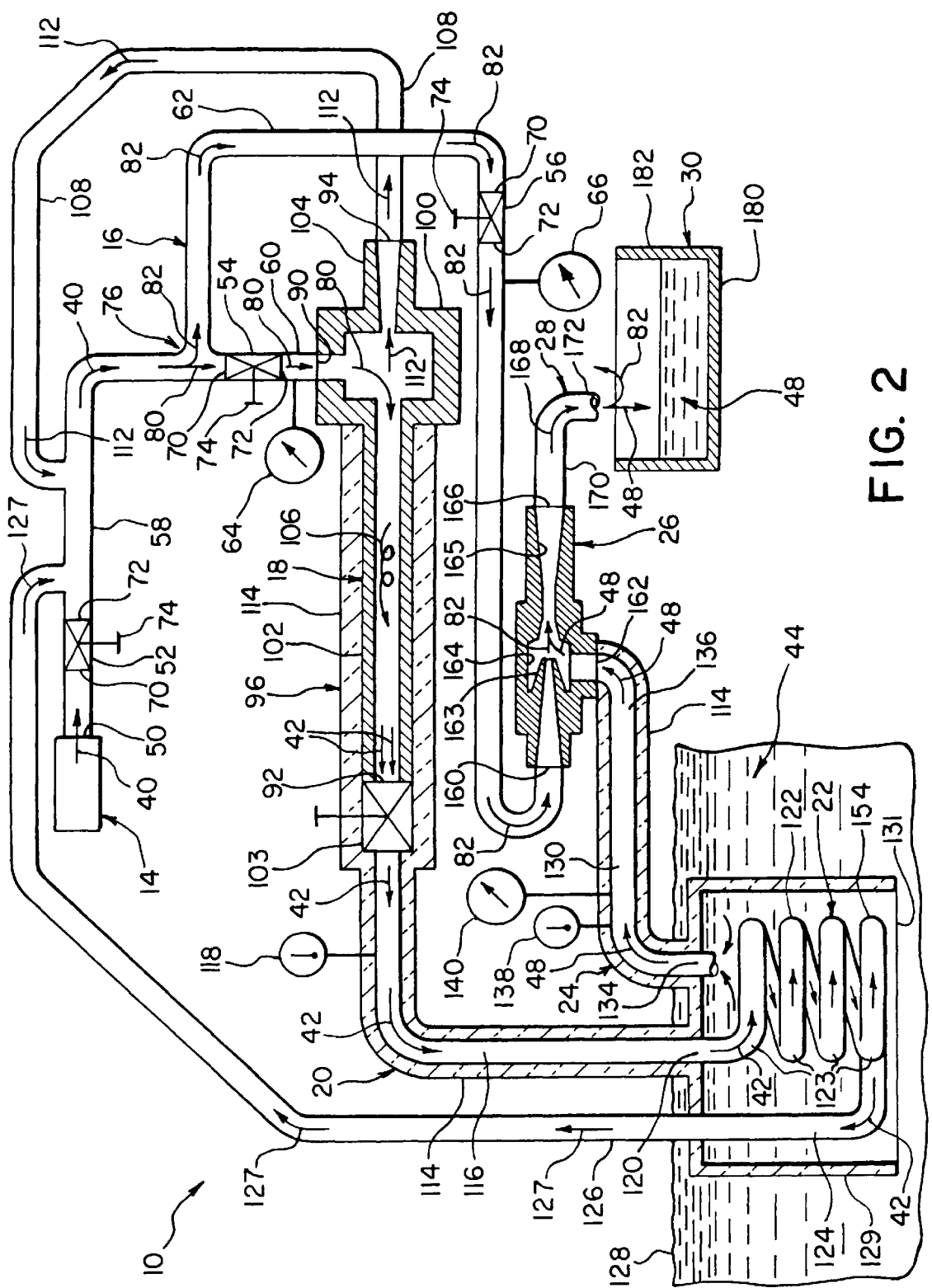
FIG. 2 is a schematic representation similar to FIG. 1, but illustrating an apparatus for collecting a substance in accordance with a second embodiment of the present invention where the pressurized fluid exiting the vortex tube, heat exchanger and jet pump are returned to the supply conduit system.

Further embodiments of apparatus 10 are possible which take advantage of the fluids which are discharged and then no longer used by apparatus 10. For instance, as seen in FIG. 2, released fluid 127 from heat exchanger 22 and/or the second supply fluid 82 exiting pipe section 170, if second supply fluid 82 is a gas, can be fluidly coupled into supply conduit system 16 for returning to vortex tube 18 and/or jet pump 26. More specifically, released fluid 127 from heat exchanger 22 can be fluidly coupled to pipe section 58 to form a closed-loop system of heated fluid and to supply a warmer pressurized fluid 40 to vortex tube 18. Additionally, cold exhaust pipe section 108 can be fluidly coupled to supply conduit system 16. In particular, cold fluid 112 from vortex tube 18 can be fluidly coupled to pipe section 58 or pipe section 62 to conserve pressurized fluid. It should be understood that each of the above-mentioned examples of embodiments taking advantage of or recycling the fluids that are discharged can be used by itself or in combination with other fluid recycling embodiments.

It should be understood that the size and specific characteristics of apparatus 10 and all of the elements thereof will be dictated by the amount and type of the substance to be retrieved. For example, a more powerful jet pump 26 producing greater suction is needed for retrieving crude oil from bodies of water located in cold environments than is needed for retrieving refined oil spilled in rivers located in warm environments. The practical limitations of the deployment of apparatus 10, such as its ability to be sported to remote locations will also be a factor in the size and specific characteristics of apparatus 10.

Figure 3:
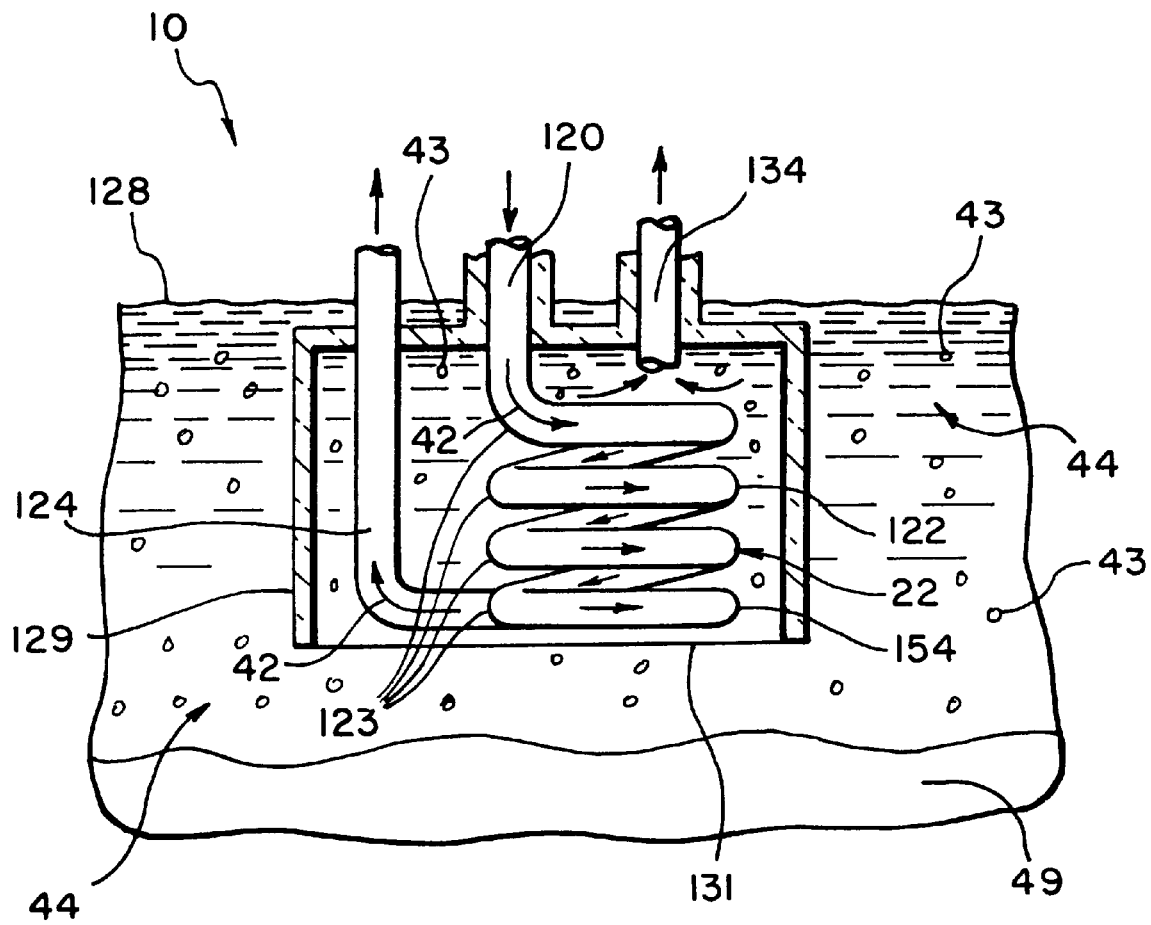
FIG. 3 is a partial schematic representation illustrating the heat exchanger being positioned in a mixture of oil and sand, which is supported only by sand.

Also, although apparatus 10 has been described with respect to retrieving spilled oil 44 from bodies of water, apparatus 10 can function equally as well retrieving fluids other than oil, such as, harmful chemicals. Further, as seen in FIG. 3, apparatus 10 can be employed for retrieving spilled fluids from land as well as from sea and/or as a heating appliance for heating liquids to facilitate their retrieval and/or pumping, such as extracting crude oil from deep wells on-shore and/or offshore. For example, the heat transferring device and the suction end of the jet pump can extend into a deep well and heat the oil and retrieve it, in a manner similar to that already disclosed herein. For example, a spilled fluid, such as oil, that is located in a desert 49 can be retrieved with the use of a more shallow heat exchanger 22. Additionally, since jet pump 26 uses no moving parts, the functioning of apparatus 10 is not threatened by the presence of sand 43 mixed with the oil 44, and can easily extract the polluted sand 43 along with the oil 44.

Still further, although apparatus 10 is disclosed as including vortex tube 18 and jet pump 26 together, other devices can be used in place of either vortex tube 18 or jet pump 26. For example, apparatus 10 can be configured such that vortex tube 18 is used as described above, but with a retrieving device different than jet pump 26, for instance, a conventional rotary vacuum pump with movable parts. Also, apparatus 10 can be configured such that jet pump 26 is used as described above, but without a heating device, or with a heating device different than vortex tube 18, for instance, a heating device with movable parts powered by an engine.

Figure 4:
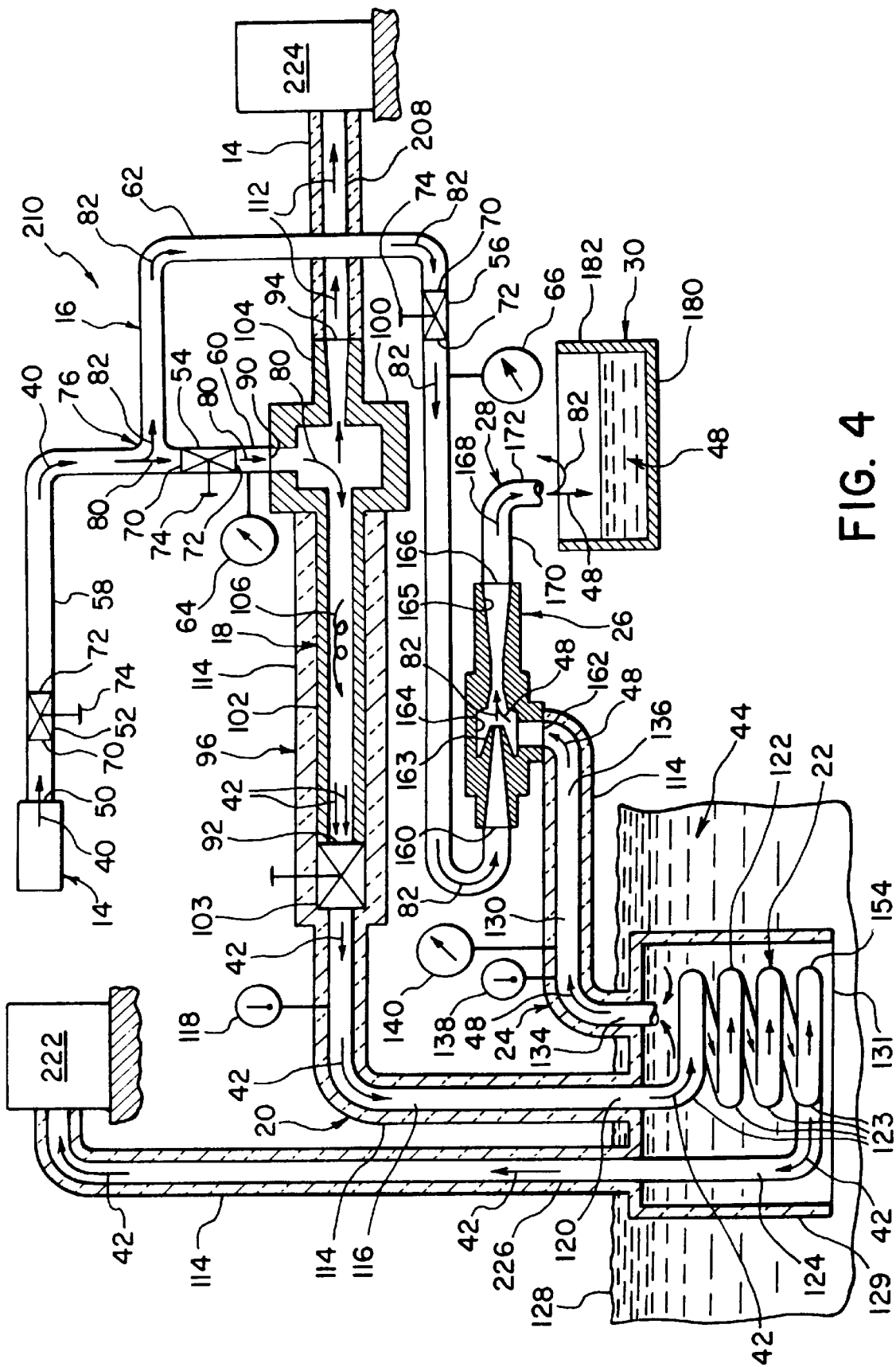
FIG. 4 is a schematic representation similar to FIG. 1, but illustrating an apparatus for collecting a substance in accordance with a third embodiment of the present invention where the pressurized fluid heated by the heating device is directed to a second heat transferring device and used for purposes other than to heat the oil, and the pressurized fluid cooled by the heating device is directed to a third heat transferring device and used for cooling a coolable substance.

A third embodiment of the present invention is illustrated in FIG. 4 as apparatus 210. Apparatus 210 is substantially identical to apparatus 10 except that in apparatus 210, the hot fluid 42 is not released to the atmosphere after passing heat exchanger 22 as in apparatus 10, but is directed to a separate heat exchanger 222 by pipe 226, which fluidly connects the heat exchanger 22 for the oil with heat exchanger 222. Additionally, cold fluid 112 is not released to the atmosphere after leaving vortex tube 18, but is directed to yet another heat exchanger 224 by pipe 208, which fluidly connects vortex tube 18 to heat exchanger 224. Accordingly, the elements of apparatus 210 that are substantially identical to those in apparatus 10 have the same reference numbers as those elements in apparatus 10 and the description of those elements is not duplicated here since all those elements are substantially identical to those in apparatus 10 and are fully described above. Additionally, those elements with the same reference number as other embodiments will not be discussed in detail here since they are fully discussed above.

Pipe sections 208 and 226 are preferably similar to the other pipe sections described, e.g., 58 and 116, and are preferably surrounded by insulation 114.

Heat exchanger 222 can be any appropriate heat exchanger using hot fluid to heat another heatable substance; such as a fluid. For example, heat exchanger 222 can be located in living accommodations and can heat the air therein by being an air heating unit or can heat the water supplied to the living accommodations by being a water heating unit. This feature enables the invention to perform multiple diverse functions and be more efficient. For example, the heat generated by heat exchanger 222 can heat, among other things, the living accommodations and the water for a crew operating the apparatus 210.

Heat exchanger 224 can be any appropriate heat exchanger using cold fluid to extract heat from a coolable substance; such as a fluid. For example, heat exchanger 224 can be located in living accommodations and can cool the air therein by being an air cooling unit or can cool the water supplied to the living accommodations by being a water cooling unit. This feature enables the invention to perform multiple diverse functions and be more efficient. For example, the heat absorbed by heat exchanger 222 can cool, among other things, the living accommodations and the water for a crew operating the apparatus 210. Thus, if both heat exchangers 222 and 224 operate simultaneously, they can provide year round heating and cooling functions for various elements. For example, heat exchangers 222 and 224 can provide heating and cooling for land vehicles of all sizes and types, such as cars, locomotives, military vehicles, mobile homes, and trucks; water vehicles of all sizes and types, such as, ships, yachts, tug boats, including under sea vehicles and all types of submarines; and/or flying vehicles of all types, such as planes, spacecraft, space stations such as Sky Lab and all types of satellites. In the above-mentioned example, any feature of the invention, in part or in whole, can be used. Also, parts of the invention used and not of high importance can be isolated using appropriate valves to close-off that particular portion of the invention and/or be reduced in size. The device can be used such that suctioning is available where needed, although the primary purpose of the device is for heating and air conditioning.

Although apparatus 210 is illustrated with both hot and cold heat exchangers 222 and 224 being separate, both heat exchangers 222 and 224 can be arranged to function in the same device; such as in a single building, or they can be operated and used completely independently.

Although apparatus is illustrated with both hot and cold heat exchangers 222 and 224 connected, only one of the heat exchangers 222 and 224 can be connected at only one time to apparatus 210, if desired. That is, only one heat exchanger 222 or 224 can be connected to apparatus 210 while the other heat exchanger 222 or 224 is replaced with an exhaust pipe such as 126 or 108. Alternatively, both heat exchangers 222 and 224 can be connected as illustrated in FIG. 4, but the placement of shut off valves in pipe 226 and in pipe 208 can allow one or both of the heat exchangers 222 and 224 to be shut off while the other or neither of the heat exchangers 222 or 224 is functioning. Of course, if shut off valves were inserted in pipe sections 226 and/or 208, these valves would necessarily redirect the fluid 42 or 112 to an exhaust pipe and then to the atmosphere or to some other heat exchanger or plural heat exchangers.

It is also possible to provide an additional pipe connection between pipe section 226 and pipe section 116 to directly connect pipe section 226 to pipe section 116 to permit hot fluid 42 to bypass heat exchanger 22 and proceed directly from vortex tube 18 to hot heat exchanger 222. This could be advantageous if, for example, it was desired to heat the living accommodations while stopping the collecting of oil 44. Further, if it was not desired to collect oil 44, but to merely heat and/or cool elements using one or both heat exchangers 222 and 224, valve 56 could be closed to stop the flow of fluid 82 to jet pump 26. Then, if pipe 226 was coupled to vortex tube 18, either through heat exchanger 22 or through direct connection described above, apparatus 210 could be used only as a heating and cooling device. However, with the turning of some valves, apparatus 210 could return to an apparatus for collecting oil. Thus, apparatus is extremely versatile in that it can, collect oil 44 and heat or cool elements through heat exchangers 222 and 224 separately or together or in any combination.

Figure 5:
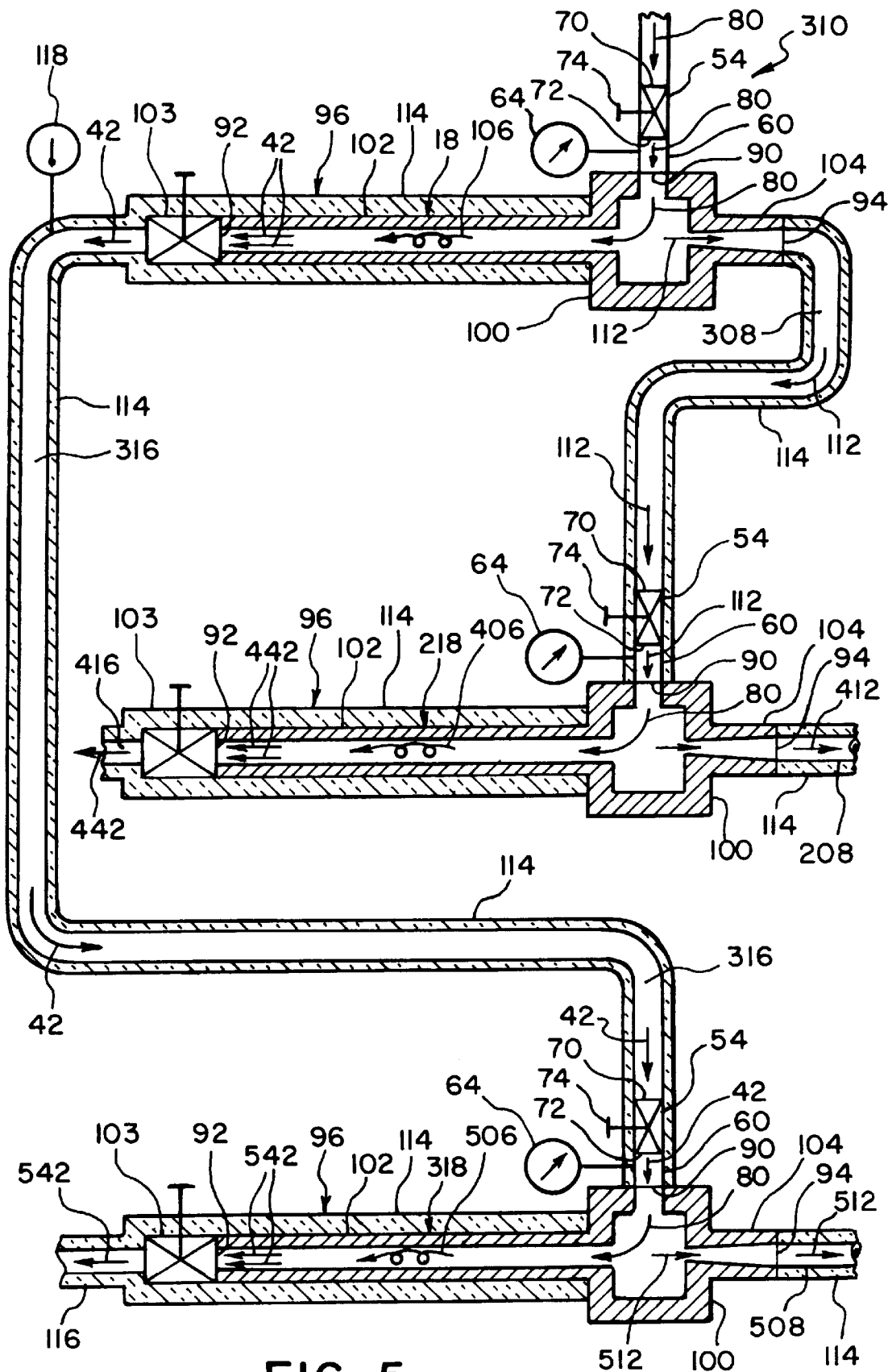
FIG. 5 is a partial schematic representation similar to FIG. 4, but illustrating an apparatus for collecting a substance in accordance with a fourth embodiment of the present invention where the pressurized fluid heated by the first heating device is directed to a second heating device and further heated and the pressurized fluid cooled by the heating device is directed to a third heating device and further cooled.

A fourth embodiment of the present invention is illustrated in FIG. 5 as apparatus 310. Apparatus 310 is substantially identical to apparatus 210 except that in apparatus 310 the cold fluid 112 is directed to a second vortex tube 218 prior to being directed to the heat exchanger 224 to further decrease the temperature of cold fluid 112 and the hot fluid 42 is directed to a third vortex tube 318 prior to being directed to heat exchanger 22 or 222 to further increase the temperature of hot fluid 42. Accordingly, the elements of apparatus 310 that are substantially identical to those in apparatus 10 and 210 have the same reference numbers as those elements in apparatus 10 and 210 and the description of those elements is not duplicated here since all those elements are substantially identical to those in apparatus 10 and 210 and are fully described above. Additionally, those elements with the same reference number as other embodiments will not be discussed in detail here since they are fully discussed above.

In apparatus 310, pipe 308 fluidly couples the passage portion 104 of vortex tube 18 to inlet 90 of vortex tube 218 and pipe 316 fluidly couples the containing portion 102 of vortex tube 18 and the inlet 90 of vortex tube 318. Pipe sections 308 and 316 are preferably similar to the other pipe sections described, e.g., 58 and 116, and are preferably surrounded by insulation 114.

Therefore, as cold fluid 112 exits vortex tube 18 it is directed via pipe 308 to vortex tube 218 where cold fluid 112 is separated via vortex 406 into a hot fluid 442 and a colder fluid 412 as discussed above with respect to vortex tube 18. Vortex tubes 18, 218 and 318 are all substantially identical. Colder fluid 412 has a lower temperature than cold fluid 112 as it leaves passage portion 104 of vortex tube 218 and enters pipe 208, which is coupled to heat exchanger 224 as discussed above. Thus, apparatus 310 has provided cold fluid for heat exchanger 224, the colder fluid 412 being at a lower temperature and having greater cooling capabilities.

As hot fluid 42 exits vortex tube 18 it is directed via pipe 316 to vortex tube 318 where hot fluid 42 is separated via a vortex 506 into a hotter fluid 542 and a cold fluid 512 as discussed above with respect to vortex tube 18. Hotter fluid 542 has a higher temperature than hot fluid 42 as it leaves containing portion 102 of vortex tube 318 and enters pipe 116, which is coupled to heat exchanger 22 and/or heat exchanger 222, as discussed above. Thus, apparatus 310 has provided hot fluid for heat exchanger 22 and/or 222, the hotter fluid 542 being at a higher temperature and having greater heating capabilities. Thus, with this embodiment, the oil 44 can be heated more easily as well as any substance heated with heat exchanger 222.

Although only two additional vortex tubes 218 and 318 have been illustrated, numerous other vortex tubes can be connected in series with vortex tubes 218 and 318 in order to further heat hotter fluid 542 and/or to further cool colder fluid 412. Also, any combination of vortex tubes can be used. For example, if the hot fluid 42 is sufficiently hot exiting vortex tube 18 for the user's needs but the cold fluid 112 is not sufficiently cold, one or more vortex tubes can be added in series to decrease the temperature of cold fluid 112 while hot fluid 42 goes directly into heat exchangers 22 and/or 222. All additional vortex tubes can be connected as illustrated in FIG. 5. Further, the feature of providing vortex tubes in series can be provided to apparatus 10 if it is desired to simply further heat hot fluid 42 prior to its use in heat exchanger 22 of apparatus 10.

The hot fluid 442 exits vortex tube 218 via pipe 416 and cold fluid 512 exits vortex tube 318 via pipe 508. Pipe sections 508 and 416 are preferably similar to the other pipe sections described, e.g., 58 and 116, and are preferably surrounded by insulation 114. Hot fluid 442 and cold fluid 512 can be exhausted into the atmosphere or can be recycled for other uses similar to the recycling of fluids discussed previously. For example, the fluids 442 and 512, along with any other exhaust fluids from any other vortex tube in series with other vortex tubes, can be returned to the fluid system to form closed loop systems or partial closed loop systems or can be coupled with additional heat exchangers for various purposes.

While an advantageous embodiment has been chosen to illustrate the invention, it will be understood by those skilled in the art that various changes and modifications can be made therein without departing from the scope of the invention as defined in the appended claims.

What is claimed is:

1. An apparatus for collecting a substance, comprising:
   a fluid source means for providing a first and a second pressurized fluid;
   a first heating device coupled to said fluid source means and being adapted to heat the first pressurized fluid from said fluid source means;
   a first heat transferring device coupled to said first heating device for receiving the heated first pressurized fluid, and being adapted for transferring heat from the first pressurized fluid to a first heatable substance;
   a vacuum producing device having first and second inlet openings, said first inlet opening fluidly coupled to said fluid source means for receiving a second pressurized fluid from said fluid source means and said second inlet opening being adapted for receiving the first heatable substance, and
   a second heat transferring device coupled to said first heating device for receiving the heated first pressurized fluid, and being adapted for transferring heat from the first pressurized fluid to a second heatable substance.

2. An apparatus according to claim 1, wherein
   said second heat transferring device is a liquid heating unit.

3. An apparatus according to claim 1, wherein
   said second heat transferring device is an air heating unit.

4. An apparatus according to claim 1, wherein
   said second heat transferring device is coupled to said first heat transferring device for receiving the heated first pressurized fluid from said first heat transferring device.

5. An apparatus according to claim 1, further comprising:
   a second heating device coupled to said first heating device and being adapted to further heat the first pressurized fluid from said first heating device and said first heat transferring device being coupled to said first heating device by said second heating device.

6. An apparatus according to claim 1, wherein
   said first heating device and said vacuum producing device are formed entirely of stationary elements, and
   said fluid source means comprises a single source of pressurized gas fluidly coupled to both said first heating device and said vacuum forming device.

7. An apparatus for collecting a substance, comprising:
   a fluid source means for providing a first and a second pressurized fluid;
   a first heating device coupled to said fluid source means and being adapted to heat a first portion of the first pressurized fluid from said fluid source means and to cool a second portion of the first pressurized fluid from said fluid source means;
   a first heat transferring device coupled to said first heating device for receiving the first portion of the first pressurized fluid, and being adapted for transferring heat from the first portion of the first pressurized fluid to a heatable substance;
   a vacuum producing device having first and second inlet openings, said first inlet opening fluidly coupled to said fluid source means for receiving a second pressurized fluid from said fluid source means and said second inlet opening being adapted for receiving the heatable substance, and
   a second heat transferring device coupled to said first heating device for receiving the second portion of the first pressurized fluid, and being adapted for transferring heat from a coolable substance to the second portion of the first pressurized fluid.

8. An apparatus according to claim 7, wherein
   said second heat transferring device is a liquid cooling unit.

9. An apparatus according to claim 7, wherein
   said second heat transferring device is an air cooling unit.

10. An apparatus according to claim 7, further comprising:
    a second heating device coupled to said first heating device and being adapted to further cool the second portion of the first pressurized fluid from said first heating device and said second heat transferring device being coupled to said first heating device by said second heating device.

11. An apparatus according to claim 7, wherein
    said first heating device and said vacuum producing device are formed entirely of stationary elements, and
    said fluid source means comprises a single source of pressurized gas fluidly coupled to both said first heating device and said vacuum forming device.

12. A method of collecting a substance, comprising the steps of:
    supplying a first pressurized fluid from a source of pressurized fluid to a first heating device;
    passing the first pressurized fluid through the first heating device to heat the first pressurized fluid;
    directing the heated first pressurized fluid from the first heating device to a first heat transferring device;
    transferring heat from the heated first pressurized fluid to a first heatable substance;
    supplying a second pressurized fluid from the source of pressurized fluid to a first inlet opening of a vacuum forming device;
    forming suction by passing the second pressurized fluid through the vacuum forming device;
    extracting the first heatable substance from an area around the first heat transferring device by suction; and
    directing the heated first pressurized fluid to a second heat transferring device.

13. A method according to claim 12, wherein
    the step of directing the heated first pressurized fluid to a second heat transferring device includes providing a liquid heating unit as the second heat transferring device.

14. A method according to claim 12, wherein
    the step of directing the heated first pressurized fluid to a second heat transferring device includes providing an air heating unit as the second heat transferring device.

15. A method according to claim 12, wherein
    the step of directing the heated first pressurized fluid to a second heat transferring device includes providing the second heat transferring device being coupled to the first heat transferring device for receiving the heated first pressurized fluid from the first heat transferring device.

16. A method according to claim 12, further comprising the steps of:
    providing a second heating device coupled to the first heating device, and wherein
    the step of directing the heated first pressurized fluid from the first heating device to a second heat transferring device includes directing the heated first pressurized fluid from the first heating device to a second heating device to further heat the heated first pressurized fluid then directing the further heated first pressurized fluid from the second heating device to the first heat transferring device.

17. A method according to claim 12, wherein the step of supplying a first pressurized fluid from a source of pressurized fluid to a first heating device includes providing the first heating device formed entirely of stationary elements, and the step of supplying a second pressurized fluid from the source of pressurized fluid to a first inlet opening of a vacuum forming device includes providing the vacuum producing device formed entirely of stationary elements, the step of supplying the first pressurized fluid to a first heating device and the step of supplying the second pressurized fluid to a vacuum forming device include simultaneously supplying first and second pressurized fluids from a single source of pressurized fluid, the single source of pressurized fluid being fluidly coupled to both the first heating device and the vacuum forming device.

18. A method of collecting a substance, comprising the steps of:

supplying a first pressurized fluid from a source of pressurized fluid to a first heating device;

passing the first pressurized fluid through the first heating device to heat a first portion of the first pressurized fluid and to cool a second portion of the first pressurized fluid;

directing the heated first portion of the first pressurized fluid from the first heating device to a first heat transferring device;

transferring heat from the heated first pressurized fluid to a heatable substance;

supplying a second pressurized fluid from the source of pressurized fluid to a first inlet opening of a vacuum forming device;

forming suction by passing the second pressurized fluid through the vacuum forming device;

extracting the heatable substance from an area around the first heat transferring device by suction; and directing the cooled second portion of the first pressurized fluid to a second heat transferring device and transferring heat from a coolable substance to the cooled second portion of the first pressurized fluid.

19. A method according to claim 18, wherein the step of directing the cooled second portion of the first pressurized fluid to a second heat transferring device includes providing a liquid cooling unit as the second heat transferring device.

20. A method according to claim 18, wherein the step of directing the cooled second portion of the first pressurized fluid to a second heat transferring device includes providing an air cooling unit as the second heat transferring device.

21. A method according to claim 18, further comprising the steps of:

providing a second heating device coupled to the first heating device, and wherein the step of directing the cooled second portion of the first pressurized fluid from the first heating device to the second heat transferring device includes directing the cooled second portion of the first pressurized fluid from the first heating device to the second heating device to further cool the cooled second portion of the first pressurized fluid and then directing the further cooled second portion of the first pressurized fluid from the second heating device to the second heat transferring device.

22. A method according to claim 18, wherein the step of supplying a first pressurized fluid from a source of pressurized fluid to a first heating device includes providing the first heating device formed entirely of stationary elements, the step of supplying a second pressurized fluid from the source of pressurized fluid to a first inlet opening of a vacuum forming device includes providing the vacuum producing device formed entirely of stationary elements, and the step of supplying the first pressurized fluid to a first heating device and the step of supplying the second pressurized fluid to a vacuum forming device include simultaneously supplying first and second pressurized fluids from a single source of pressurized fluid, the single source of pressurized fluid being fluidly coupled to both the first heating device and the vacuum forming device.

23. A method of supplying pressurized fluid to a heat transferring device, comprising the steps of:

providing a source of pressurized fluid, a first heating device, a first heat transferring device, a vacuum forming device, and a second heat transferring device all coupled together;

supplying a first pressurized fluid from the source of pressurized fluid to the first heating device;

passing the first pressurized fluid through the first heating device to heat the first pressurized fluid;

directing the heated first pressurized fluid from the first heating device the second heat transferring device;

transferring heat from the heated first pressurized fluid to a first heatable substance; and prohibiting the passage of the pressurized fluid from the source of pressurized fluid to the vacuum forming device.

24. A method according to claim 23, wherein the step of directing the heated first pressurized fluid to a second heat transferring device includes providing a liquid heating unit as the second heat transferring device.

25. A method according to claim 23, wherein the step of directing the heated first pressurized fluid to a second heat transferring device includes providing an air heating unit as the second heat transferring device.

26. A method according to claim 23, wherein the step of directing the heated first pressurized fluid to a second heat transferring device includes providing the second heat transferring device being coupled to the first heat transferring device for receiving the heated first pressurized fluid from the first heat transferring device.

27. A method according to claim 23, further comprising the steps of:

providing a second heating device coupled to the first heating device, and wherein the step of directing the heated first pressurized fluid from the first heating device to the second heat transferring device includes directing the heated first pressurized fluid from the first heating device to a second heating device to further heat the heated first pressurized fluid then directing the further heated first pressurized fluid from the second heating device to the second heat transferring device.

28. A method according to claim 23, wherein the step of supplying a first pressurized fluid from a source of pressurized fluid to a first heating device includes providing the first heating device formed entirely of stationary elements.

29. A method of supplying pressurized fluid to a heat transferring device, comprising the steps of:

providing a source of pressurized fluid, a first heating device, a first heat transferring device, a vacuum forming device, and a second heat transferring device all coupled together;

supplying a first pressurized fluid from the source of pressurized fluid to the fist heating device;

passing the first pressurized fluid through the first heating device to heat a first portion of the first pressurized fluid and to cool a second portion of the first pressurized fluid;

prohibiting the passage of pressurized fluid from the source of pressurized fluid to the vacuum forming device; and directing the cooled second portion of the first pressurized fluid to a second heat transferring device and transferring heat from a coolable substance to the cooled second portion of the first pressurized fluid.

30. A method according to claim 29, wherein the step of directing the cooled second portion of the first pressurized fluid to a second heat transferring device includes providing a liquid cooling unit as the second heat transferring device.

31. A method according to claim 29, wherein the step of directing the cooled second portion of the first pressurized fluid to a second heat transferring device includes providing an air cooling unit as the second heat transferring device.

32. A method according to claim 29, further comprising the steps of:

providing a second heating device coupled to the first heating device, and wherein the step of directing the cooled second portion of the first pressurized fluid from the first heating device to the second heat transferring device includes directing the cooled second portion of the first pressurized fluid from the first heating device to the second heating device to further cool the cooled second portion of the first pressurized fluid and then directing the further cooled second portion of the first pressurized fluid from the second heating device to the second heat transferring device.

33. A method according to claim 29, wherein the step of supplying a first pressurized fluid from a source of pressurized fluid to a first heating device includes providing the first heating device formed entirely of stationary elements.

* * * * *